United States Patent
Hosen et al.

(10) Patent No.: US 9,254,867 B2
(45) Date of Patent: Feb. 9, 2016

(54) DUST COVER FOR BALL JOINT

(71) Applicant: NOK CORPORATION, Tokyo (JP)

(72) Inventors: Tatsuro Hosen, Makinohara (JP); Junichi Ishimori, Makinohara (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/420,558

(22) PCT Filed: Aug. 2, 2013

(86) PCT No.: PCT/JP2013/070965
§ 371 (c)(1),
(2) Date: Feb. 9, 2015

(87) PCT Pub. No.: WO2014/024784
PCT Pub. Date: Feb. 13, 2014

(65) Prior Publication Data
US 2015/0210314 A1    Jul. 30, 2015

(30) Foreign Application Priority Data
Aug. 9, 2012 (JP) ................. 2012-177226

(51) Int. Cl.
*B62D 7/16* (2006.01)
*F16C 11/06* (2006.01)
*F16J 3/04* (2006.01)
*B62D 3/02* (2006.01)

(52) U.S. Cl.
CPC .. *B62D 7/16* (2013.01); *B62D 3/02* (2013.01); *F16C 11/0671* (2013.01); *F16J 3/042* (2013.01); *F16C 11/0628* (2013.01); *Y10T 403/32631* (2015.01)

(58) Field of Classification Search
None
See application file for complete search history.

(56) References Cited

U.S. PATENT DOCUMENTS

| | | | |
|---|---|---|---|
| 3,208,290 A | 9/1965 | Mathues et al. | |
| 3,279,833 A * | 10/1966 | Ihnacik, Jr. | 403/51 |
| 5,066,159 A * | 11/1991 | Urbach | 403/51 |
| 6,834,863 B2 * | 12/2004 | Urbach | 403/51 |
| 6,935,803 B2 * | 8/2005 | Abels et al. | 403/50 |
| 7,238,114 B2 * | 7/2007 | Wang et al. | 277/635 |
| 9,004,494 B2 * | 4/2015 | Foote | 277/563 |
| 2003/0222412 A1 | 12/2003 | Urbach | |

FOREIGN PATENT DOCUMENTS

| | | | |
|---|---|---|---|
| JP | S62-137408 U | 6/1987 | |
| JP | H02-048610 U | 4/1990 | |

(Continued)

*Primary Examiner* — Victor MacArthur
(74) *Attorney, Agent, or Firm* — Harness, Dickey & Pierce, P.L.C.

(57) ABSTRACT

In a dust cover for a ball joint, a reinforcing ring is buries in a shaft side attaching portion closely fitted and fixed to an outer peripheral surface of a shaft portion of a ball stud in the ball joint, and an inner peripheral collar portion is formed in an inner peripheral portion of the reinforcing ring, the inner peripheral collar portion having a slightly larger inner diameter than an inner peripheral surface of the shaft side attaching portion. One sealing projection and the other sealing projection are alternately formed in the inner peripheral surface of the shaft side attaching portion, the one sealing projection being arranged at a position in an inner periphery of the inner peripheral collar portion of the reinforcing ring, and the other sealing projection being arranged at a position deviated from the inner periphery of the inner peripheral collar portion.

6 Claims, 7 Drawing Sheets

(56) References Cited

FOREIGN PATENT DOCUMENTS

| | | | |
|---|---|---|---|
| JP | 2004-003663 A | 1/2004 |
| JP | 2006-300204 A | 11/2006 |
| JP | 2007-032747 A | 2/2007 |
| JP | 2009-014064 A | 1/2009 |

* cited by examiner

DUST COVER FOR BALL JOINT

CROSS-REFERENCE TO RELATED APPLICATIONS

This application is a 371 U.S. National Stage Application of International Application No. PCT/JP2013/070965 filed on Aug. 2, 2013, and published in Japanese as WO 2014/024784 A1 on Feb. 13, 2014. This application claims priority to Japanese Application No. 2012-177226 filed on Aug. 9, 2012. The entire disclosures of the above applications are incorporated herein by reference.

BACKGROUND OF THE INVENTION

1. Field of the Invention

The present invention relates to a dust cover which is installed to a ball joint of a steering device in a vehicle.

2. Description of the Conventional Art

Figure 13:
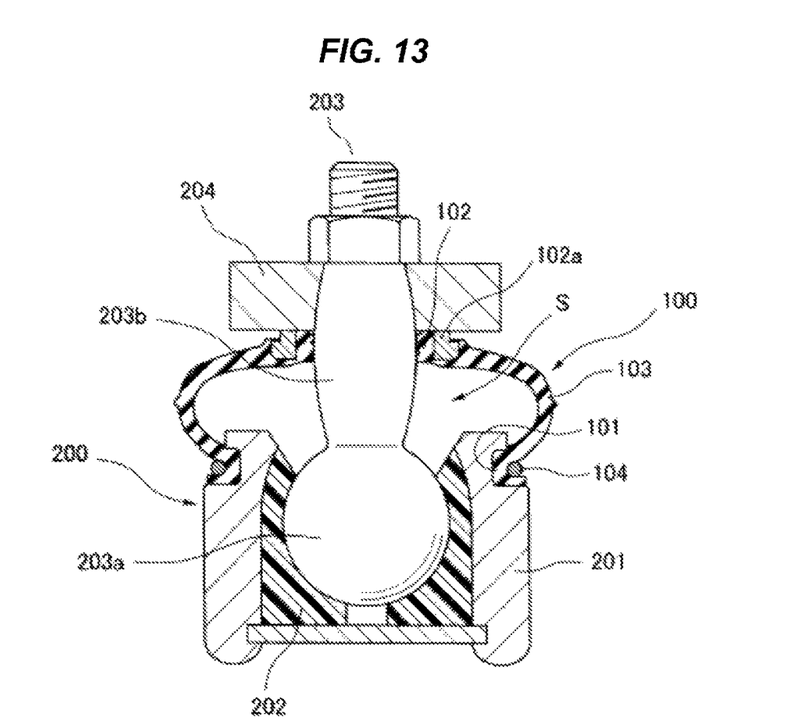
FIG. 13 is a cross sectional view of an installed state and shows a dust cover for a ball joint according to the prior art.

As a dust cover which is installed to a ball joint of a steering device in the vehicle, a structure as shown in FIG. 13 has been conventionally known.

More specifically, this kind of dust cover 100 is formed by a rubber-like elastic material (a rubber material or a synthetic resin material having a rubber-like elasticity), and is provided with a relatively large-diameter housing side attaching portion 101 which is fastened and fixed to an outer periphery of a housing 201 retaining a socket 202 of a ball joint 200 by a snap ring 104, a relatively small-diameter shaft side attaching portion 102 which is brought into close contact with a knuckle 204 fixed to a shaft portion 203b of a ball stud 203 in the ball joint 200 and is closely fitted and fixed to an outer periphery of the shaft portion 203b, and a tubular flexible film portion 103 which connects between the housing side attaching portion 101 and the shaft side attaching portion 102. A reinforcing ring 102a is buried in the shaft side attaching portion 102, the reinforcing ring 102a being provided for enhancing a close contact performance with the shaft portion 203b of the ball stud 203 and made of a synthetic resin.

This kind of dust cover 100 prevents a grease (not shown) which is filled at an appropriate amount in an inside space S from flowing out toward an external portion, prevents dusts from entering into a fitting portion between the socket 202 and a spherical end portion 203a of the ball stud 203 from the external portion, and is structured such that the flexible film portion 103 freely deforms as the ball stud 203 oscillates in relation to the housing 201 (refer, for example, to Japanese Unexamined Patent Publication No. 62-137408).

SUMMARY OF THE INVENTION

Problem to be Solved by the Invention

Figure 14:
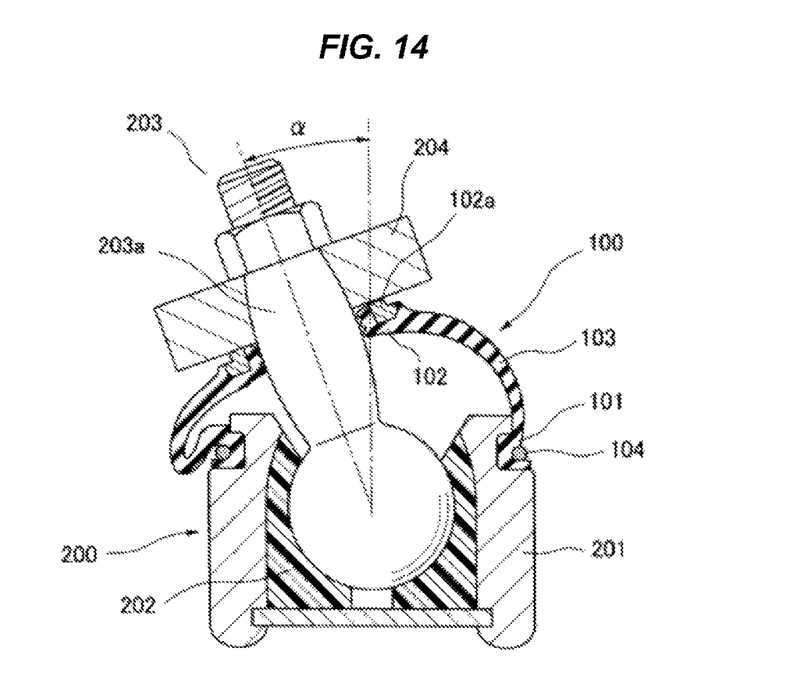
FIG. 14 is a cross sectional view of an operating state and shows the dust cover for the ball joint according to the prior art.

However, since the rubber-like elastic material of the dust cover 100 is cured and an elasticity of the film portion 103 is deteriorated at the low temperature time, a following property of the shaft side attaching portion 102 in the dust cover 100 in relation to the shaft portion 203b of the ball stud 203 is lowered in the case that the ball stud 203 is oscillated greatly at cc. As a result, there is generated a port opening that a sealing projection of the shaft side attaching portion 102 is detached from the shaft portion 203b of the ball stud 203 and the knuckle 204 as shown in FIG. 14, and a problem that a sealing function is lowered is pointed out.

The present invention is made by taking the point as mentioned above into consideration, and a technical object of the present invention is to provide a dust cover for a ball joint which dissolves the problem that the shaft side attaching portion of the dust cover is detached from the shaft portion of the ball stud and the sealing performance is lowered at the low temperature time.

Means for Solving the Problem

As a means for effectively achieving the technical object mentioned above, a dust cover for a ball joint according to the invention of a first aspect is structured such that a reinforcing ring is buries in a shaft side attaching portion which is closely fitted and fixed to an outer peripheral surface of a shaft portion of a ball stud in the ball joint, and an inner peripheral collar portion is formed in an inner peripheral portion of the reinforcing ring, the inner peripheral collar portion having an inner diameter which is slightly larger than an inner peripheral surface of the shaft side attaching portion.

A dust cover for a ball joint according to the invention of a second aspect is the structure described in the first aspect, wherein one sealing projection and the other sealing projection are alternately formed in the inner peripheral surface of the shaft side attaching portion, the one sealing projection being arranged at a position in an inner periphery of the inner peripheral collar portion of the reinforcing ring, thereby having a relatively smaller diametrical thickness, and the other sealing projection being arranged at a position which is deviated from the inner periphery of the inner peripheral collar portion, thereby having a relatively larger diametrical thickness.

A dust cover for a ball joint according to the invention of a third aspect is the structure described in the second aspect, wherein inner diameters of the sealing projections are different from each other.

Effect of the Invention

On the basis of the dust cover for the ball joint according to the present invention, since the inner peripheral collar portion formed in the reinforcing ring which is buried in the shaft side attaching portion backs up the close contact force of the shaft side attaching portion in relation to the outer peripheral surface of the shaft portion in the ball stud, the following property against the oscillation of the ball stud is compensated even if the elasticity of the flexible film portion is lowered due to the curing of the rubber-like elastic material of the dust cover at the low temperature time. As a result, it is possible to effectively prevent the sealing performance from being lowered due to "port opening" that the sealing projection of the shaft side attaching portion is detached from the shaft portion of the ball stud.

DETAILED DESCRIPTION OF PREFERRED EMBODIMENTS

A description will be given below of preferable embodiments of a dust cover for a ball joint according to the present invention with reference to the accompanying drawings. First of all, FIG. 1 is a cross sectional view of an installed state and shows a first embodiment, FIG. 2 is a cross sectional view of an uninstalled state, and FIG. 3 is a cross sectional view of a substantial part.

Figure 1:
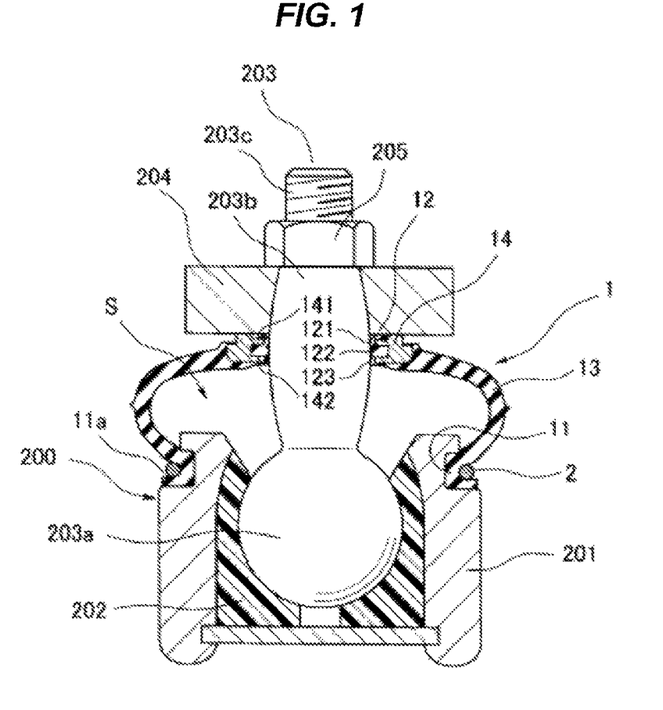
FIG. 1 is a cross sectional view of an installed state and shows a first embodiment of a dust cover for a ball joint according to the present invention.

As shown in FIG. 1, a ball joint 200 is constructed by a housing 201, a socket 202 which is retained within the housing 201, and a ball stud 203 in which a spherical end portion 203a is rotatably fitted to the socket 202. A knuckle 204 is fixed to a shaft portion 203b of the ball stud 203 by a nut 205 which is threadably engaged with a thread portion 203b, and a dust cover 1 according to an embodiment of the present invention is attached between the housing 201 and the shaft portion 203b for protecting the ball joint 200.

Figure 2:
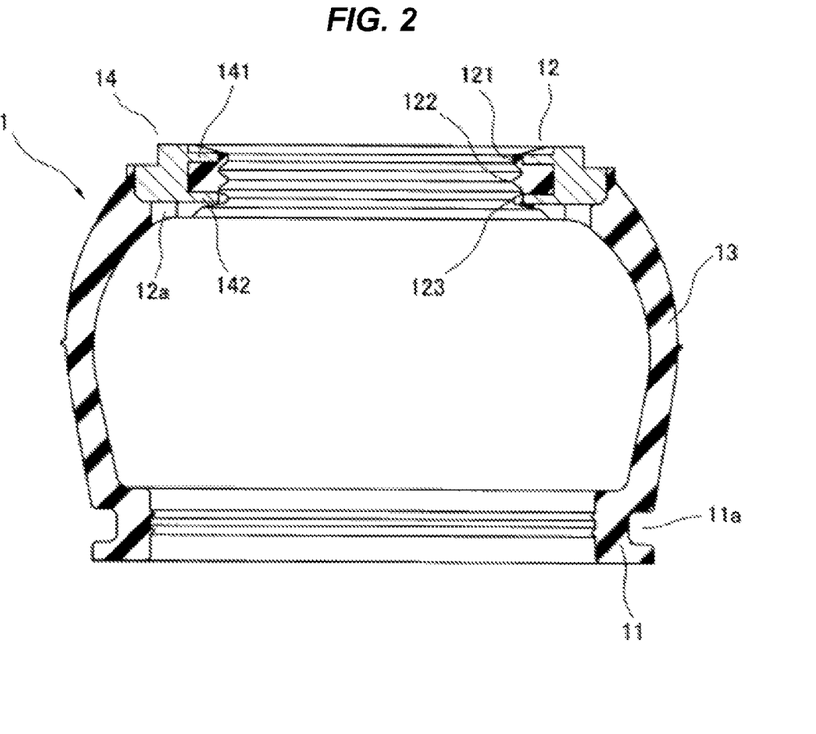
FIG. 2 is a cross sectional view of an uninstalled state and shows the first embodiment of the dust cover for the ball joint according to the present invention.
Figure 3:
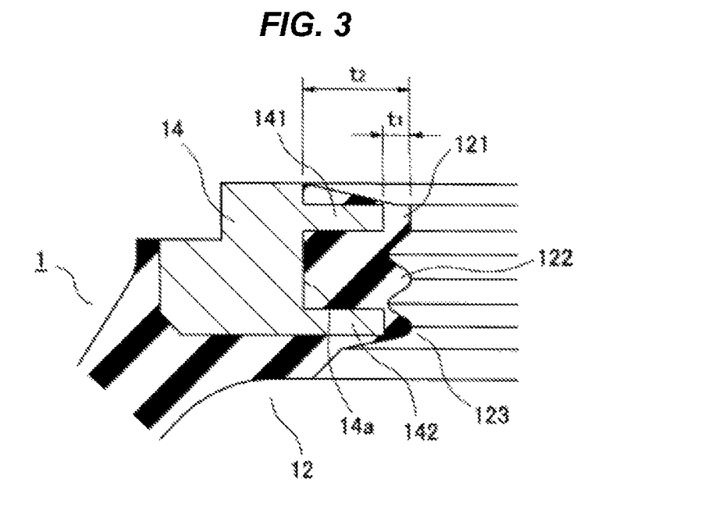
FIG. 3 is a cross sectional view of a substantial part and shows the first embodiment of the dust cover for the ball joint according to the present invention.

The dust cover 1 is formed by a rubber-like elastic material (a rubber material or a synthetic resin material having a rubber-like elasticity), is provided with a relatively large-diameter housing side attaching portion 11 which is fastened and fixed to an outer peripheral surface of the housing 201 of the ball joint 200, a relatively small-diameter shaft side attaching portion 12 which is fixed to an outer peripheral surface of the shaft portion 203b of the ball stud 203 and the knuckle 204 in a close contact state, and a tubular flexible film portion 13 which connects between the housing side attaching portion 11 and the shaft side attaching portion 12, and is formed as a whole into an outer appearance that a cup is inverted, in an uninstalled state, as shown in FIG. 2.

More specifically, the housing side attaching portion 11 of the dust cover 1 is structured such that its inner peripheral surface is closely fitted to an annular step portion formed in an outer peripheral surface in the vicinity of an end portion of the housing 201 of the ball joint 200 with an appropriate fastening margin, by means of a snap ring 2 which is fitted and attached to an annular groove in an outer periphery.

Further, the shaft side attaching portion 12 of the dust cover 1 has a plurality of sealing projections 121 to 123 which are formed in an inner peripheral surface, as shown in FIG. 2, and is structured such that the sealing projections 121 to 123 are closely fitted to an outer peripheral surface of the shaft portion 203b of the ball stud 203, and its outer end surface is brought into close contact with the knuckle 204.

A reinforcing ring 14 constructed by a metal or a synthetic resin is integrally buried in the shaft side attaching portion 12 of the dust cover 1. The reinforcing ring 14 is vulcanization bonded to the shaft side attaching portion 12 of the dust cover 1 in a buried state by concentrically setting within a metal mold (not shown) in a molding process of the dust cover 1 by the rubber-like elastic material, and filling an unvulcanized rubber material in a molding cavity which is defined between the reinforcing ring 14 and an inner surface of the metal mold according to a mold clamping so as to heat and pressurize. Reference symbol 12a in FIG. 2 denotes a mold mark caused by a projection (not shown) for positioning and supporting the reinforcing ring 14 within the metal mold.

Further, an inner peripheral surface of the reinforcing ring 14 has an inner peripheral collar portion 141 which extends toward the outermost sealing projection 121 and an inner peripheral collar portion 142 which extends toward the innermost sealing projection 123, as is also shown in FIG. 3. Inner diameters of the inner peripheral collar portions 141 and 142 are slightly larger than inner diameters of the sealing projections 121 and 123 which correspond to the inner peripheral surface of the shaft side attaching portion 12.

A relative inner peripheral concave portion 14a is provided between the inner peripheral collar portions 141 and 142 in the reinforcing ring 14, and is formed into a cylindrical surface shape. Therefore, the sealing projections 121 and 123 are structured such that a diametrical thickness t1 is small due to the inner peripheral collar portions 141 and 142, and the intermediate sealing projection 122 is structured such that a thickness t2 is larger due to the relative inner peripheral concave portion 14a. The inner diameters of the sealing projections 121 to 123 are approximately equal to each other.

The dust cover 1 for the ball joint according to the first embodiment structured as mentioned above prevents the dusts from entering into the fitting portion between the socket 202 of the ball joint 200 and the spherical end portion 203a of the ball stud 203 as well as preventing the grease (not shown) filled at an approximate amount in the inside space S from flowing out to the external portion, as shown in FIG. 1, and is structured such that the flexible film portion 13 freely deforms according to the oscillation of the ball stud 203 in relation to the housing 201.

Figure 4:
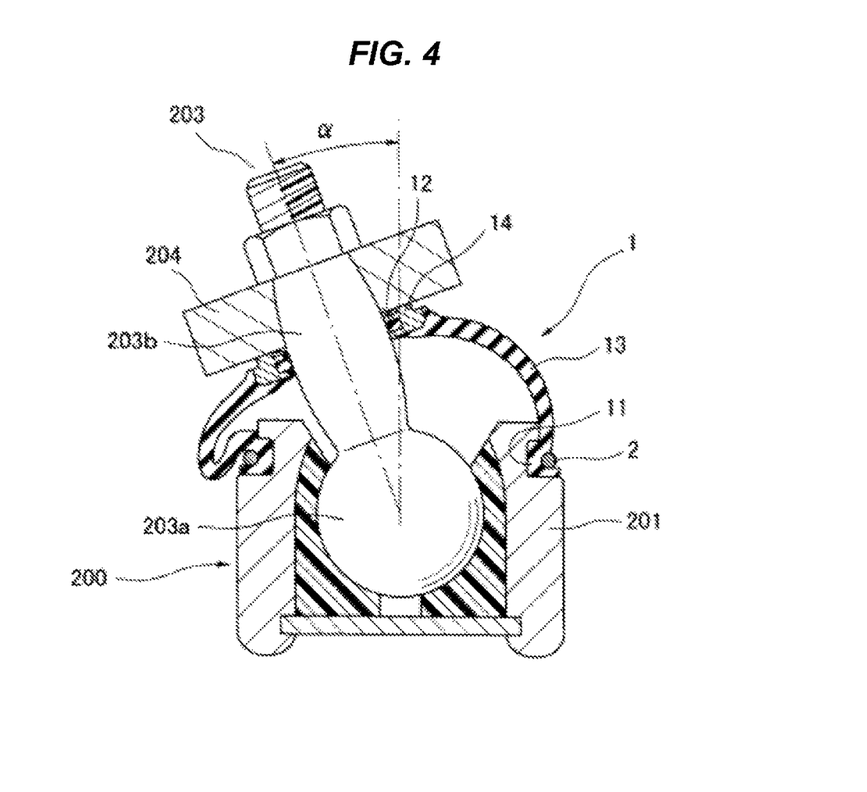
FIG. 4 is a cross sectional view of an operating state and shows the first embodiment of the dust cover for the ball joint according to the present invention.

Further, according to the first embodiment, since the inner peripheral collar portions 141 and 142 formed in the reinforcing ring 14 buried in the shaft side attaching portion 12 back up the close contact force of the sealing projections 121 and 123 of the shaft side attaching portion 12 in relation to the outer peripheral surface of the shaft portion 203b of the ball stud 203, the following property to the oscillation of the shaft portion 203b of the ball stud 203 is compensated even if the elasticity of the flexible film portion 13 is lowered by the curing of the rubber-like elastic material in the dust cover 1 at the low temperature time. Further, the intermediate sealing projection 122 is soft because the thickness t2 to the reinforcing ring 14 is large, and maintains the stable close contact performance in relation to the shaft portion 203b. As a result, it is possible to effectively prevent the reduction of the sealing performance caused by "port opening" that the shaft side attaching portion 12 is detached from the shaft portion 203b of the ball stud 203 when greatly oscillating the ball stud 203 at α as shown in FIG. 4.

Figure 5:
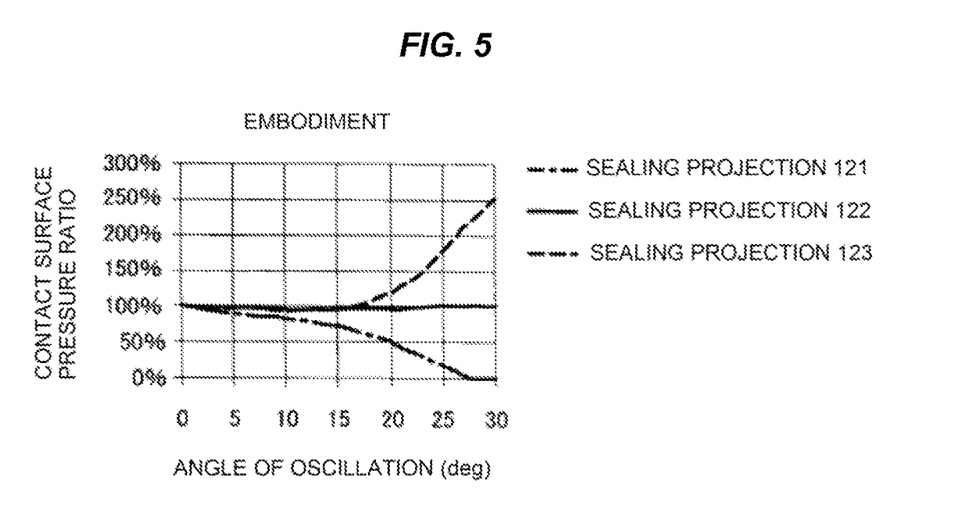
FIG. 5 is a graph showing a result obtained by performing an FEM analysis about the first embodiment of the dust cover for the ball joint according to the present invention.
Figure 6:
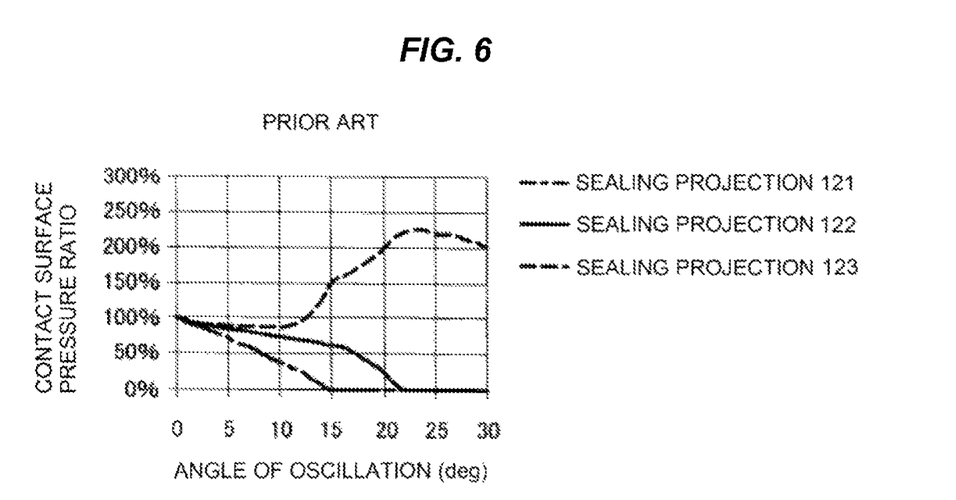
FIG. 6 is a graph showing a result obtained by performing the FEM analysis about a dust cover for a ball joint according to the prior art.

FIG. 5 is a graph showing a result of FEM analysis for checking the following property of the shaft side attaching portion when oscillating the ball stud under a low temperature condition of −40° C. about the embodiment mentioned above, and FIG. 6 is a graph showing a result obtained by analyzing in the same manner the dust cover according to the prior art previously described and shown in FIG. 13. In the graphs, a contact surface pressure ratio 0% indicates the fact that the close contact state of the sealing projection with the outer peripheral surface of the shaft portion in the ball stud is lost. As is apparent from the results of analysis, in the prior art shown in FIG. 6, the outermost sealing projection 121 is detached from the outer peripheral surface of the shaft portion at 15 deg of the angle of oscillation, and the intermediate sealing projection 121 is detached from the outer peripheral surface of the shaft portion at 22 deg of the angle of oscillation. On the contrary, in the dust cover according to the embodiment, the close contact state with the outer peripheral surface of the shaft portion is kept less than 28 deg of the angle of oscillation, and the intermediate sealing projection 122 is approximately uniform its surface pressure in spite of change of the angle of oscillation, and is confirmed to maintain a stable sealing performance.

Next, FIGS. 7 to 11 show the other embodiments of the dust cover for the ball joint according to the present invention.

Figure 7:
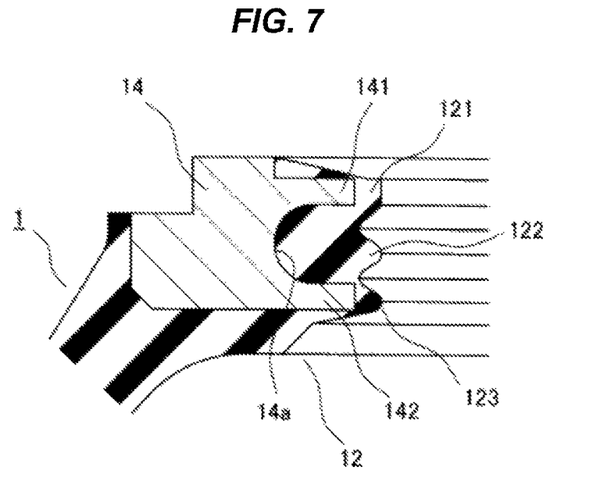
FIG. 7 is a cross sectional view of a substantial part and shows a second embodiment of the dust cover for the ball joint according to the present invention.

Among them, a second embodiment shown in FIG. 7 is structured such that the relative inner peripheral concave portion 14a between the inner peripheral collar portions 141 and 142 in the reinforcing ring 14 is formed into a concave surface having a circular arc cross section, and the rest is the same as the first embodiment.

According to the structure, it is possible to enhance a mechanical strength of the inner peripheral collar portions 141 and 142 as well as the same effects as those of the first embodiment are achieved.

Figure 8:
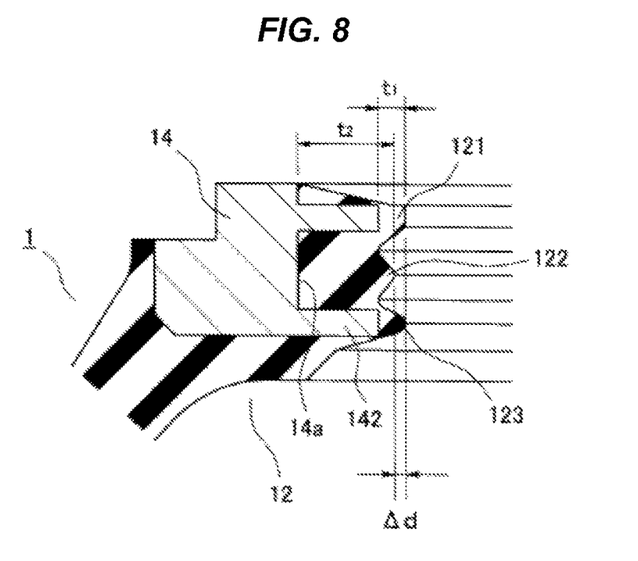
FIG. 8 is a cross sectional view of a substantial part and shows a third embodiment of the dust cover for the ball joint according to the present invention.

Further, a third embodiment shown in FIG. 8 is structured such that the inner diameter of the intermediate sealing projection 122 is slightly larger (the height is smaller) only at Δd than the inner diameters of the outermost sealing projection 121 and the innermost sealing projection 123. More specifically, the diametrical thickness t1 of the sealing projections 121 and 123 from the inner diameters of the inner peripheral collar portions 141 and 142 is set to be approximately the same as that of the first embodiment shown in FIG. 3, and the diametrical thickness t2 of the sealing projection 122 from the relative inner peripheral concave portion 14a between the inner peripheral collar portions 141 and 142 is set to be slightly smaller than that of the first embodiment. The rest is structured in the same manner as the first embodiment. It goes without saying that the intermediate sealing projection 122 has a fastening margin in relation to the shaft portion 203b of the ball stud 203 shown in FIGS. 1 and 4.

According to the structure, the intermediate sealing projection 122 maintains the stable close contact performance with the small surface pressure with the shaft portion 203b as well as the same effects as those of the first embodiment are achieved.

Figure 9:
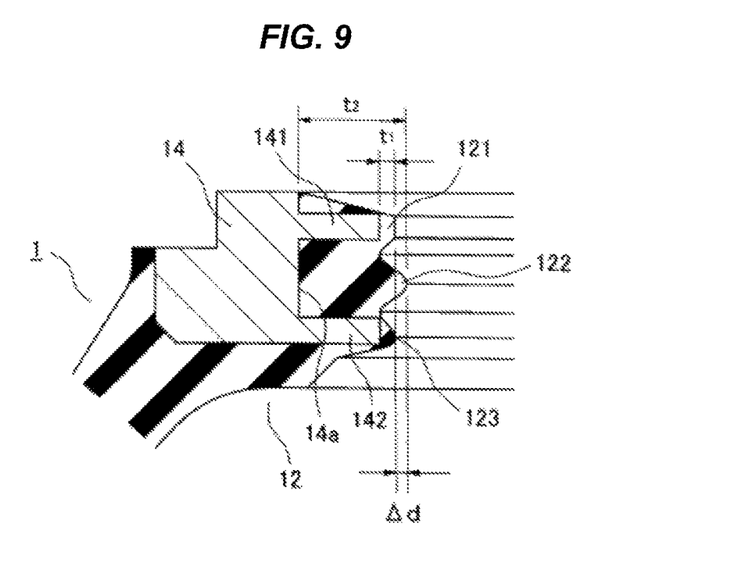
FIG. 9 is a cross sectional view of a substantial part and shows a fourth embodiment of the dust cover for the ball joint according to the present invention.

Further, a fourth embodiment shown in FIG. 9 is structured such that the inner diameter of the intermediate sealing projection 122 is slightly smaller (the height is larger) only at Δd than the inner diameters of the outermost sealing projection 121 and the innermost sealing projection 123, inversely to the third embodiment shown in FIG. 8, and the rest is structured in the same manner as the first embodiment.

According to the structure, a more excellent sealing performance than the first embodiment can be obtained since the surface pressure of the sealing projection 122 is higher than the first embodiment while having the same fastening margin of the sealing projections 121 and 123 with the shaft portion 203b of the ball stud 203, as well as the same effects as those of the first embodiment are achieved.

Figure 10:
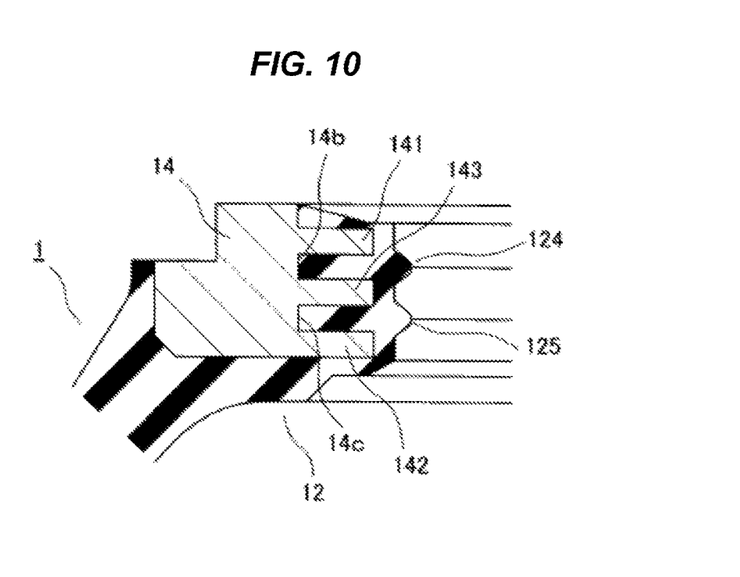
FIG. 10 is a cross sectional view of a substantial part and shows a fifth embodiment of the dust cover for the ball joint according to the present invention.

Further, a fifth embodiment shown in FIG. 10 is structured such that three inner peripheral collar portions 141 to 143 are formed in the inner peripheral surface of the reinforcing ring 14, and sealing projections 124 and 125 are respectively formed at positions corresponding to a relative inner peripheral concave portion 14b between the outermost inner peripheral collar portion 141 and the intermediate inner peripheral collar portion 143 of the reinforcing ring 14, and a relative inner peripheral concave portion 14c between the intermediate inner peripheral collar portion 143 and the innermost inner peripheral collar portion 142 of the reinforcing ring 14, among the inner peripheral surfaces of the shaft side attaching portion 12. The rest is structured in the same manner as the first embodiment.

In the structure, the following property to the oscillation of the shaft portion 203b of the ball stud 203 shown in FIG. 1 is compensated by the inner peripheral collar portions 141 to 143, and the stable close contact performance with the shaft portion 203b is maintained because the thickness from the sealing projections 124 and 125 to the inner peripheral concave portions 14b and 14c is large. Therefore, it is possible to achieve the same effect as the first embodiment.

Figure 11:
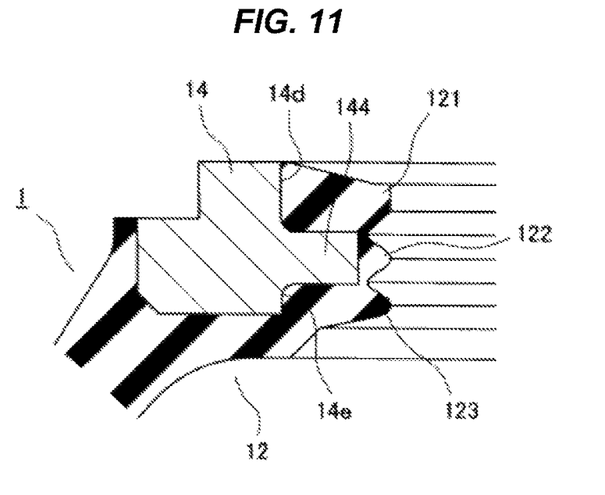
FIG. 11 is a cross sectional view of a substantial part and shows a sixth embodiment of the dust cover for the ball joint according to the present invention.

Further, a sixth embodiment shown in FIG. 11 is structured such that one inner peripheral collar portion 144 is formed in the inner peripheral surface of the reinforcing ring 14, the inner peripheral collar portion 144 extending toward the intermediate inner peripheral collar portion 143 in the shaft side attaching portion 12. The rest is structured in the same manner as the first embodiment.

Therefore, in the structure, the following property to the oscillation of the shaft portion 203b of the ball stud 203 shown in FIG. 1 is compensated by the inner peripheral collar portion 144, and the stable close contact performance with the shaft portion 203b is maintained because the thickness from the sealing projections 121 and 123 to the inner peripheral concave portions 14d and 14e in both sides of the inner peripheral collar portion 144 is large. As a result, it is possible to achieve the same effect as the first embodiment.

Figure 12:
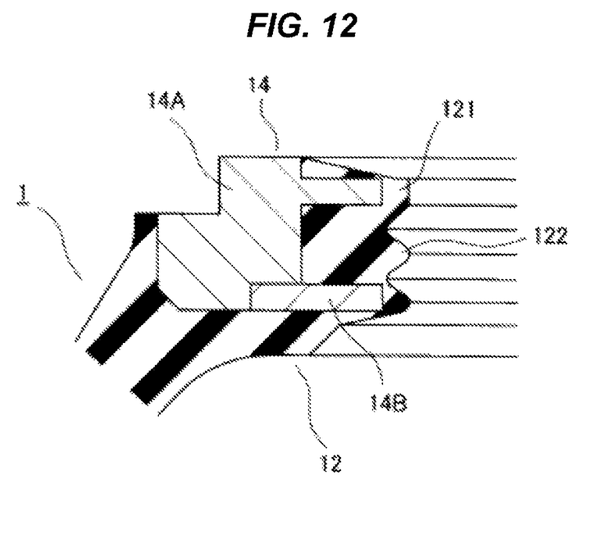
FIG. 12 is a cross sectional view of a substantial part and shows a seventh embodiment of the dust cover for the ball joint according to the present invention.

In the case that a plurality of inner peripheral collar portions are provided in the inner peripheral surface of the reinforcing ring 14, the reinforcing ring 14 may be structured such that a plurality of members 14A and 14B are integrated by fitting, for example, a seventh embodiment shown in FIG. 12.

What is claimed is:

1. A dust cover for a ball joint having a ball stud including a shaft, the dust cover comprising:
  a shaft side attaching portion closely fitted and fixed to an outer peripheral surface of said shaft; and
  a reinforcing ring buried in said haft side attaching portion;
  said reinforcing including:
    first and second inner peripheral collars projecting diametrically inwardly relative to an inner peripheral surface of said reinforcing ring; and
    a groove-shaped inner peripheral concavity formed between the first and second inner peripheral collars and along the inner peripheral surface of said reinforcing ring, each of the first and second inner peripheral collars having an inner diameter which is larger than an inner diameter of an inner peripheral surface of said shaft side attaching portion;

said inner peripheral surface of said shaft side attaching portion having:

an outermost sealing projection radially aligned with said first inner peripheral collar;

an innermost sealing projection radially aligned with said inner peripheral collar; and an intermediate sealing projection radially aligned with said inner peripheral surface of said reinforcing ring; and the outermost and innermost sealing projections have a smaller diametrical thickness relative to the first and second inner peripheral collars than that of the intermediate sealing projection relative to the inner peripheral surface of said reinforcing ring.

2. The dust cover for the ball joint according to claim 1, wherein an inner diameter of the intermediate sealing projection is different than an inner diameter of each of the innermost and outermost.

3. The dust cover for the ball joint according to claim 1, wherein the reinforcing ring comprises a plurality of members fittably integrated together.

4. The dust cover for the ball joint according to claim 1, wherein the reinforcing ring further comprises:

a base; and a ring fit to the base, the base including the first inner peripheral collar; and the ring including the second inner peripheral collar.

5. The dust cover for the ball joint according to claim 4, wherein the base includes an annular notch, and the ring is nested within the notch.

6. The dust cover for the ball joint according to claim 1, wherein the second inner peripheral collar is a portion of a discrete member of the reinforcing ring.

\* \* \* \* \*